Figure 1:
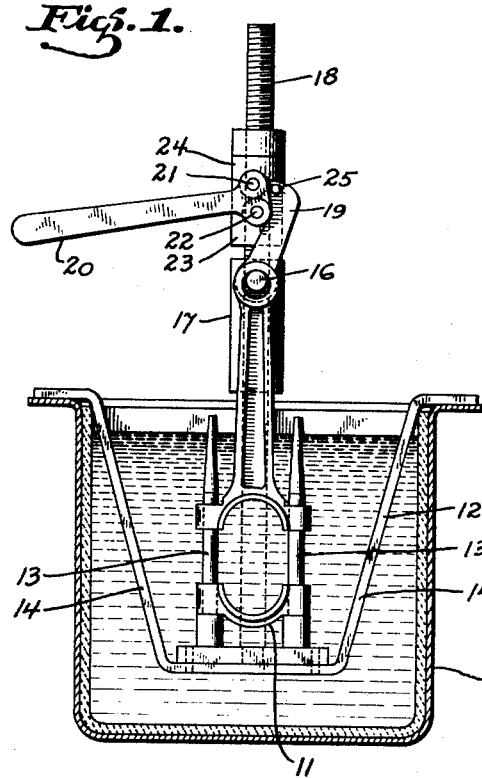

Dec. 5, 1933.  R. D. PIKE ET AL  1,937,840

METHOD OF UNITING OR SOLDERING

Filed June 17, 1930

INVENTORS.
Robert D. Pike,
Joseph Krill.
BY Townsend, Loftus & Affett
ATTORNEYS.

Patented Dec. 5, 1933

1,937,840

UNITED STATES PATENT OFFICE 1,937,840

METHOD OF UNITING OR SOLDERING

Robert D. Pike, Diablo, and Joseph Krill, San Francisco, Calif., assignors to Kalif Corporation, Emeryville, Calif., a corporation of Delaware Application June 17, 1930. Serial No. 461,710

6 Claims. (Cl. 29—149.5)

This invention relates to the manufacture of bearing bushings in which a pre-formed bearing liner is securely and integrally fastened into a back of steel, cast iron or other strong supporting metal by means of an intermediate thin layer of soldering or brazing metal having a relatively low melting point. Our invention is particularly applicable to placing a bronze bushing in the crank pin end of a connecting rod for automotive engines, although it may be applied to a wide variety of other bearings.

An object of our invention is to provide a method whereby tin or ordinary solder may be employed to effect a practically 100% union between a pre-formed bearing liner and a back. This has not been accomplished before because of the fact that the soldering medium could not be maintained continuous nor free from oxidation. Our invention is also applicable to cadmium-zinc and other solders.

A further object of our invention is to provide a cheap means for integrally securing a bronze bushing into the crank pin end of an automotive connecting rod or other type of bearing. A further object of our invention is to provide a lined bearing of the class described in which the liner is continuous around the full 360° of the bearing.

A further object of our invention is to provide an automotive connecting rod with an integrally secured bushing of bronze or other suitable bearing alloy of relatively high melting point without having heated the heat treated alloy steel of the connecting rod heat to a temperature high enough to anneal it. A further object of our invention is to provide a bearing with a stiff back and a pre-formed copper-base bearing liner bonded thereto by a low melting point solder so that by heating above the melting point of the solder the liner can be removed without injury to the back, leaving the latter ready to receive a new liner.

For the sake of simple illustration but not for limitation, we will describe our process as applied to the production of an automotive connecting rod with a full 360° bushing of a copper-lead alloy.

Referring to the drawing—

Figure 2:
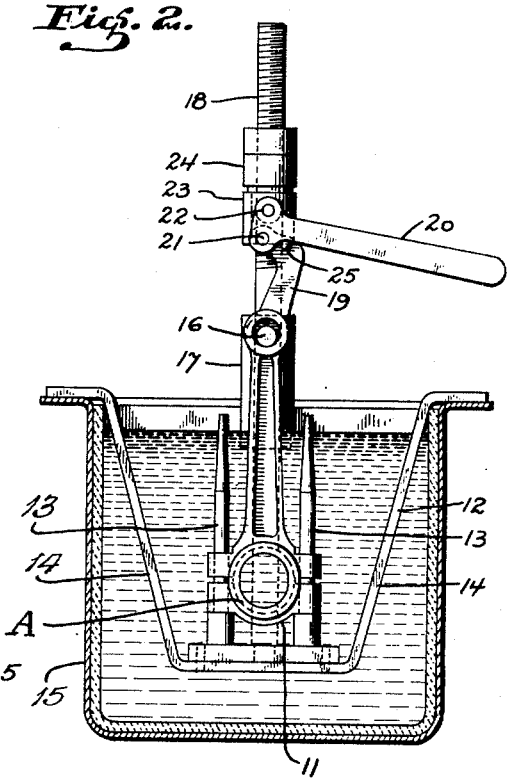
Figure 3:
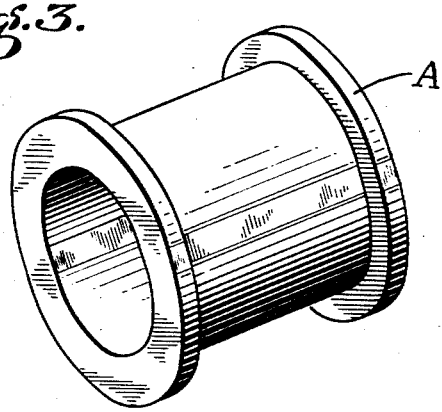

Fig. 1 is a view showing apparatus for holding and centering the connecting rod with the cap and placed in a bath of molten metal, ready to receive the bushing, Fig. 2 is a view similar to Fig. 1, but showing the connecting rod in clamped position with the bushing in place, and Fig. 3 is a perspective of the bushing.

A shows a bushing of bearing metal which has been deformed by suitable presses (not illustrated) into an ovoid shape. The projecting ends of the bushing are true semicircles which will fit accurately into the shank and cap respectively of the connecting rod.

In carrying out our process the inside faces of the shank and cap are accurately machined to make a full circle when assembled. They are tinned in conventional manner, preferably with pure tin and quenched in the same flux solution which was used on the steel before tinning. The cap of the rod 11 is now assembled in the fixture 12 by slipping its bolt holes over the posts 13.

The entire fixture is then immersed to a predetermined level in a bath of molten tin held preferably at a temperature of 600° F.

The fixture is shown, as provided, with the side extension 14 which, by engaging with the sides of the tin pot 15, hold the work at proper depth below the surface of the tin. This depth is so chosen that the entire bushing A and the entire head of the rod is immersed in the tin bath during the operation of securing the bushing in the rod.

The next step in the process is to dip the bushing A in flux, then immerse in the tin bath and place it in the cap 11 with its longest diametric axis in a substantially vertical position. The shank of the rod is now immersed in the tin and its bolt holes slipped over the posts 13, the hole in the wrist pin end at the same time being slipped over the pin 16 which is integral with the sleeve 17 which slides freely over the upright 18 which is an integral part of the above mentioned holding fixture.

When the upper rod hole is slipped over the pin the latter is held in its uppermost position by the link 19 which is secured to the short arm of the lever 20 by the pin 21. The fulcrum of the lever is the pin 22 which is integral with the sleeve 23 which also slides on upright 18. The position of sleeve 23 on upright 18 is fixed by turning threaded sleeve 24 which is rotatably attached to 23. Thus the vertical alignment of the fulcrum pin 22 may be accurately adjusted.

The shank of the rod having been thus positioned the lever 20 is swung through an arc of 180°. This moves the shank down and tightly presses it onto the bushing A beneath the tin. The stop pin 25 arrests the movement of the lever just after the pin 21 has swung slightly past the position which locks the lever.

Thus a heavy pressure is applied to the bushing between the cap and shank beneath the surface of the tin and an absolutely complete layer of tin is assured between the bushing and the cap and shank respectively.

At this stage of the process the actual integral securing of the bushing has been accomplished and the next step is to cool the bearing and rod down to room temperature without permitting the tin to bleed out of the joint. This may be done by instantaneously chilling in water, steam or other cooling medium, a preferred method is to remove the entire locked fixture from the tin bath which is at about 600° F. and to place it in other metallic bath which is fluid at a temperature which is lower than the melting point of tin.

A convenient bath for this purpose is a molten bath of lead-tin solder at a temperature held somewhat below the melting point of pure tin which is 450°. In this way the tin joint is rapidly cooled below its melting point and any shrinkage of the tin joint is filled with solder.

The result is a virtual 100% soldered bond between the bushing and the rod. The next step is to unlock the fixture, remove the rod and mill away the bronze bushing between the cap and shank. The rod is then re-assembled and bored to a true circle.

Generally our invention applies to the bonding of a preformed bearing liner of relatively high melting point into a steel or other strong back, the bonding medium applying to virtually all of the contacting surfaces and being of the nature of a metallic braze or solder having a lower melting point than either the back or the liner.

The apparatus for performing the process is described and claimed in the copending application entitled "Bearing bushing press", filed July 21, 1930, Serial No. 469,485.

Having thus described our invention, what we claim and desire to secure by Letters Patent is—

1. The method of adhesively uniting solid objects which comprises submerging said articles separated from each other in fluent adhesive to coat substantially the whole surfaces thereof therewith, assembling them in the desired relation while submerged therein, pressing them together while so assembled and submerged, and removing them from said fluent adhesive into a medium adapted to cause the adhesive therebetween to set while maintaining them pressed together in assembled relation until said adhesive has set.

2. The method of soldering together solid objects which comprises submerging said articles separated from each other in molten solder to coat substantially the whole surfaces thereof therewith, assembling them in the desired relation while submerged therein, pressing them together while so assembled and submerged, and removing them from said fluent solder into a medium adapted to cause the solder therebetween to solidify while maintaining them pressed together in assembled relation until said solder has solidified.

3. The method of bonding a pre-formed bearing liner to a relatively strong back which comprises submerging said liner and back separated from each other in a bath of relatively low melting point soldering metal to coat substantially the whole surfaces thereof therewith, assembling them in the desired relation while submerged therein, pressing them together while so assembled and submerged, and removing them from said bath while maintaining said assembled and pressed-together relation until the soldering metal therebetween has solidified.

4. The method of bonding a pre-formed bearing liner to a relatively strong back which comprises submerging said liner and back separated from each other in a bath of relatively low melting point soldering metal to coat substantially the whole surfaces thereof therewith, assembling them in the desired relation while submerged therein, pressing them together while so assembled and submerged, and, while maintaining said assembled and pressed-together relation, removing them from said bath and quickly chilling to prevent leakage of the soldering metal from the joint.

5. The method of bonding a pre-formed bearing liner to a relatively strong back which comprises submerging said liner and back separated from each other in a bath of relatively low melting point soldering metal to coat substantially the whole surfaces thereof therewith, assembling them in the desired relation while submerged therein, pressing them together while so assembled and submerged, and, while maintaining said assembled and pressed-together relation, removing them from said bath and chilling so as to quickly solidify the soldering metal in the joint by submerging in a bath of molten metal at a lower temperature than the melting point of the soldering metal.

6. The method of providing a continuous and uniform metallic support to a preformed bearing by continuous and uniform metallic attachment to a supporting back, which comprises submerging said liner and back, separated from each other, in a bath of relatively high melting point soldering metal, assembling them in final position while submerged therein, and while maintaining said assembled position, removing them from said bath and chilling so as to quickly solidify the first soldering metal, in a second bath of relatively low melting point soldering metal, removing from the second bath and rapidly cooling so as to solidify any of the low melting solder which may have been drawn between the back and bearing during the solidification of the high melting solder.

ROBERT D. PIKE.
JOSEPH KRILL.